United States Patent [19]

De Bonneville

[11] Patent Number: 4,981,575
[45] Date of Patent: Jan. 1, 1991

[54] METHOD OF CATALYTIC REFORMING IN A PLURALITY OF SIDE-BY-SIDE FLUIDIZED BED REACTION ZONES

[75] Inventor: Jean De Bonneville, Rueil Malmaison, France

[73] Assignee: Institut Francais du Petrole, Rueil Malmaison, France

[21] Appl. No.: 427,059

[22] Filed: Oct. 26, 1989

[30] Foreign Application Priority Data

Oct. 27, 1988 [FR] France ................. 88 14246

[51] Int. Cl.⁵ ............................................. C10G 35/04
[52] U.S. Cl. .................................... 208/64; 208/134; 208/140; 585/407
[58] Field of Search ............... 208/64, 134, 140; 585/407

[56] References Cited

U.S. PATENT DOCUMENTS

| | | | |
|---|---|---|---|
| 3,839,196 | 10/1974 | Plackmann et al. | 208/174 |
| 3,856,662 | 12/1974 | Greenwood | 208/174 |
| 4,167,473 | 9/1979 | Sikomia | 208/140 |
| 4,172,027 | 10/1979 | Ham et al. | 208/140 |

*Primary Examiner*—Curtis R. Davis
*Attorney, Agent, or Firm*—Millen, White & Zelano

[57] ABSTRACT

The invention concerns a method of catalytic reforming in a plurality of fluidized bed type reaction zones located side by side, the catalyst circulating from zone to zone with the aid of elevating means and a carrier gas in the form of hydrogen. According to the invention, nitrogen is used as the elevating gas to raise the exhausted catalyst drawn off from the bottom of the last catalytic zone (through which the feedstock passes) to the top of the catalyst regenerating zone, and also to raise the regenerated catalyst to the top of the first catalytic zone through which the feedstock passes.

5 Claims, 3 Drawing Sheets

METHOD OF CATALYTIC REFORMING IN A PLURALITY OF SIDE-BY-SIDE FLUIDIZED BED REACTION ZONES

BACKGROUND OF THE INVENTION

The invention concerns a method of continously converting hydrocarbons, in the presence of a catalyst, at a temperature of from 480° to 600° C., wherein an initial feedstock comprising hydrocarbons and hydrogen are circulated through at least two fluidized bed type reaction zones; the catalyst circulates through the reaction zone in the form of a fluidized bed, flowing continuously down said zone; it is then drawn off continuously from the bottom of the reaction zone and passed into a regenerating zone; the regenerated catalyst is sent into a zone for treatment with hydrogen, separate from the reaction zone, where it is treated at a temperature generally bellow the reaction temperature; after the hydrogen treatment the catalyst is passed continuously into a sulfurizing zone, separate from the hydrogen treatment zone and separate from the reaction zone; and after being treated with a sulphur compound, the catalyst flows continously to the reaction zone.

The invention more particularly concerns a method of hydro reforming hydrocarbons; the feedstock may be a naphtha distilling at from about 60° to about 220°, particularly a direct distillation naphtha; it also concerns the production of aromatic hydrocarbons, for example the production of benzene, toluene and xylenes (ortho, meta or para), either from saturated or unsaturated gasolines (e.g., gasolines modified by cracking, particularly thermal cracking, or by catalytic reforming), or from naphthenic hydrocarbons which can be converted into aromatic hydrocarbons by dehydrogenation.

The feedstock circulates successively in each reactor or reaction zone in an axial or radial flow (that is, from center to periphery or from periphery to center). The reaction zones are arranged in series, side by side, so that the feedstock flows successively through each of them, with intermediate heating between zones; the fresh catalyst is introduced at the top of the first reaction zone where the fresh feedstock is introduced; it then flows continuously down that zone and is drawn off continuously at the bottom; any appropriate means (particularly a lift) is used to convey it to the top of the next reaction zone, in which it again flows down continuously, and so on to the last reaction zone, where it is drawn off continuously from the bottom, then passed into a regenerating zone.

The catalyst is circulated from the bottom of one reaction zone to the top of another, from the bottom of the last reaction zone to the regenerating zone and from the bottom of the regenerating zone to the top of the first reaction zone using any known elevating means. In the rest of the description and the claims, these means will be referred to as a "lift".

The solid which is displaced from one reaction zone to another and to the regenerating zone may, for example, be a granular catalyst. The catalyst may, for example, be in the form of spherical pellets generally from 1 to 3 mm and preferably from 1.5 to 2 mm in diameter, although the invention is not restricted to these values. The apparent density of the catalyst is generally from 0.4 to 1, preferably from 0.5 to 0.9 and more particularly from 0.55 to 0.8, although the invention is not restricted to these values.

The actual regeneration of the catalyst may be carried out by any known means. The catalyst is preferably subjected to:

(a) Combustion by means of a gas containing molecular oxygen;

(b) Oxychlorination by means of a gas containing molecular oxygen and simultaneously by means of a halogen or halogen compound, for example, a hydrohalic acid or an alkyl halide and;

(c) A final treatment by a gas containing molecular oxygen.

The three treatments are carried out either successively in a single fixed bed or in a fluidized bed, with the catalyst passing successively into three separate zones where each of the three regenerating stages are carried out.

Regeneration is followed by purging, for example with nitrogen, to eliminate any traces of residual gaseous oxygen from the catalyst.

Applicant's U.S. Pat. No. 4,172,027 describes several aspects of such a process. In particular, FIG. 1 of the present application corresponds to the prior art described in U.S. Pat. No. 4,172,027 corresponds to a method which is still currently used for the many advantages it offers.

In FIG. 1, which is given to illustrate prior art, purified hydrogen from the unit, which has been purified, is used as the lift gas. This so-called purified hydrogen may contain up to 10 volume percent or preferably 4% of various light hydrocarbons such as ethane and propane. It should be noted that methane is not considered as an impurity up to a volume equal to that of the hydrogen; this means that in this case, at the upper limit, the so-called purified hydrogen stream would contain 50 volume percent of methane.

The hydrogen from the unit can thus be used as it is as the lift gas, not only temporarily when the other hydrogen sources run out but also, after simple purification, as a hydrogen source throughout the whole reforming or aromatic hydrocarbon producing reaction, for hydrogen treatment of the regenerated catalyst and, when the regenerating zone is beside the first reactor, as a fluid providing the lift required to raise the catalyst above the first reactor after it has been regenerated and treated with hydrogen.

In FIG. 1 three reactors are used. The feedstock is introduced through the pipe 1, the furnace 2 and the line 3 into the first reactor 29. The effluent from the first reactor is drawn off through the pipe 30 and passed through the oven 37 and pipe 38 into the second reactor 42. The effluent from the second reactor is drawn off through the pipe 43 and passed through the oven 50 and pipe 51 into the third reactor 55. The effluent from the third reactor is drawn off through the pipe 56. When the unit is started up, the fresh catalyst is introduced through the pipe 4 in FIG. 1. The catalyst from the regenerating zone 10 enters the first reactor 29 through the pipes 27 and 28, in which it travels in the form of a fluidized bed. The catalyst is drawn off from the reactor 29 through a plurality of pipes such as 31 and 32 and through the pipe 33, through which it reaches the lift pot 34. This drawing off is a continuous process (a valve system is not essential), since the flow rate of the catalyst is regulated by an appropriate conventional control using hydrogen (pure or from the unit), which is injected through a pipe (not shown).

Enough gas is withdrawn from the unit to prevent part of the effluent from the reaction from being entrained with the particles of catalyst. The catalyst is then conveyed from the lift pot 34 to the second reactor 42 by any known elevating device, which will be referred to as a "lift" in this specification. As explained above, the lift fluid is advantageously recycled hydrogen or hydrogen produced by the unit and is introduced through the pipe 35. The catalyst thus conveyed in the lift 36 reaches the container 39, from which it reaches the second reactor 42 through a plurality of pipes such as 40 and 41. (The container 39 and pipes 40 and 41 could be an integral part of the reactor 42; that is they may be provided right inside the reactor. The catalyst passes through the reactor 42 in the form of a fluidized bed, is drawn off from it continuously as with the first reactor 29 through the plurality of pipes such as 44 and 45, and reaches the lift pot 47 through the pipe 46.

The catalyst passes through the lift 49, which may, e.g., be supplied with recycled hydrogen through the pipe 48. It reaches the container 52, from which it passes through the plurality of pipes such as 53 and 54 to arrive at the third fluidized bed reactor 55. The catalyst is drawn off continuously from the reactor 55 as it was from the first and second reactors 29 and 42, through the plurality of pipes 57 and 58; this exhausted catalyst reaches the lift pot 30 through the pipe 59. The exhausted catalyst is then sent into a "storage and settling" vessel 7 by means of the lift 6, which may be supplied with recycled hydrogen introduced through the pipe 61 into the lift pot 60. Passing through the valve system 8 (there are generally two valves about 10 to 15 cm in size on an industrial scale and the pipes 21 and 9, the exhausted catalyst reaches the regenerating zone 10. When it has been regenerated and purged therein, the catalyst passes through the lines 11 and 13 and the valve system 12 (there are again generally two valves about 10 to 15 cm in size) into the upper part of a tank 15. Purified hydrogen from the unit, is introduced into the tank 15 through the pipe 14 with preheating in the oven 5. The catalyst travels in the form of fluidized bed to the lower part or zone 26 of the tank 15; the regenerated catalyst is treated with hydrogen in the zone 26, using hydrogen introduced through the pipe 14. It moves within, zone 26 in the form of a fluidized bed.

In FIG. 1 the catalyst, which has been regenerated and treated with hydrogen, is drawn off continuously from the tank 15 through the pipe 16 and reaches the lift pot 17. From here, the catalyst carries continuously by hydrogen from the unit which is purified and introduced through the pipe 18 into the lift 19, to a receiving vessel 20 located above the first reactor 29 in FIG. 7. From the receiving vessel 20 the catalyst then flows continuously in the form of a fluidized bed through a plurality of pipes or "legs" such as 27 and 28, to the first reactor 29. Sulfurization, which takes place when the regenerated catalyst has been hydrogenated, is carried out partly in the lift pot 17, partly in the lift 19, and possibly partly in the vessel 20 and legs 27 and 28. The sulphur compound and possibly hydrogen (preferably hydrogen from the unit, purified) acting as a carrying gas for the sulphur compound, are fed into the lift pot 17 through the pipe 24.

The catalyst travels continuously within the zones 15, 17 and 20, the lift 19 and the associated pipes. This ensures that the hydrogen treatment and sulfurization temperatures are well regulated and avoids subjecting the catalyst to sudden temperature changes.

During the hydrogen treatment the excess hydrogen can be eliminated through the discharge pipe 22.

However, a layout of this type has some disadvantages due to the use of hydrogen as the lift gas (the gas used to lift the catalytic particles from a low to a high position, for example from the bottom of one reactor to the top of the next one, from the bottom of the last reactor to the top of the regenerating zone and from the bottom of the regenerating zone to the top of the first reactor). The disadvantage of using hydrogen is felt chiefly upstream and downstream of the regenerating zone (10). The regenerating zone must be free of any trace of hydrogen. So the hydrogen from the lift 6 which has brought the catalyst from the last reactor 55 to the regenerator has to be removed with effective purging and well upstream of the regenerating zone 10. Similarly, a hydrogen stream has to be re-established downstream of the regenerating zone, in order to drive the regenerated catalyst through the lift into the first reactor. These arrangements for protecting the regenerator from any trace of hydrogen at present require valves, e.g., 8, 8a, 12 and 12a in the drawing, which valves are currently fairly large (approximately 4 inches (10.16 cm) and are being replaced by 6 inch or 15.27 cm valves) due to the hydrogen pressures near the tank 15. FIG. 1 is simplified, showing two valves 8 and 8a and two valves 12 and 12a, though in reality there are five or six valves 4 or 6 inches in size upstream of the regenerator (10) and the same number downstream. Heretofore such valves have always posed specific manufacturing and safety problems.

SUMMARY OF THE INVENTION

The invention makes it possible to avoid using hydrogen near the regenerator. In the method and apparatus according to the invention, hydrogen is replaced by nitrogen (or any other inert gas) in the lift transporting the exhausted catalyst from the last reactor through which the feedstock passes to the regenerator, and also in the lift transporting the regenerated catalyst from the regenerator to the first reactor through which the feedstock passes. According to the invention it is however important to use hydrogen in the other lifts of catalytic reforming unit as taught in Applicant's, U.S. Pat. Nos. 4,133,733; 4,210,519 and 4,233,268, which explain the advantages of hydrogen over inert gases as transporting gases in lifts. The method and apparatus of the invention will in particular make it possible to reduce the number of 4- or 6 -inch valves upstream and downstream of the regenerator 10. This technique avoids the expensive manufacture and operation of an excessive number of large diameter valves.

It should be noted that when regeneration is over, the regenerator is purged with nitrogen (or another inert gas) to eliminate any trace of oxygen. So from that time there is an inert gas atmosphere for the advance of the catalyst to the lift for carrying the regenerated catalyst to the first reactor, whereas in the prior art, hydrogen had to be reintroduced when the regenerator had been purged, that is to say, there was an additional operation, which is avoided here.

According to the invention the two surge tanks 7 and 15 above and below the regenerator 10 are under nitrogen in FIG. 2 (instead of being under hydrogen in FIG. 1).

$N_2$–$H_2$ separation (and thus safety) is provided in pipes of small diameter, e.g. approximately 2 inches (i.e., 5.08 cm) instead of lines of about 4 or 6 inches (10.16 or 15.27 cm) or even larger, and it is therefore much easier to achieve.

In normal operation, $N_2$-$H_2$ separation is obtained by pressure barriers (barrages) (Delta P in the correct direction, that is, in the direction leading to an pressure in the nitrogen lines higher than that in the hydrogen lines.

All this results in considerable simplification in these transfer lines between the surge tanks 7 and 15 and the regenerator 10.

The apparatus consequently requires fewer 4 or 6 inch valves, as explained above, while complying with the same imposed safety regulations.

DETAILED DESCRIPTION OF FIGS. 2 AND 3

Figure 1:
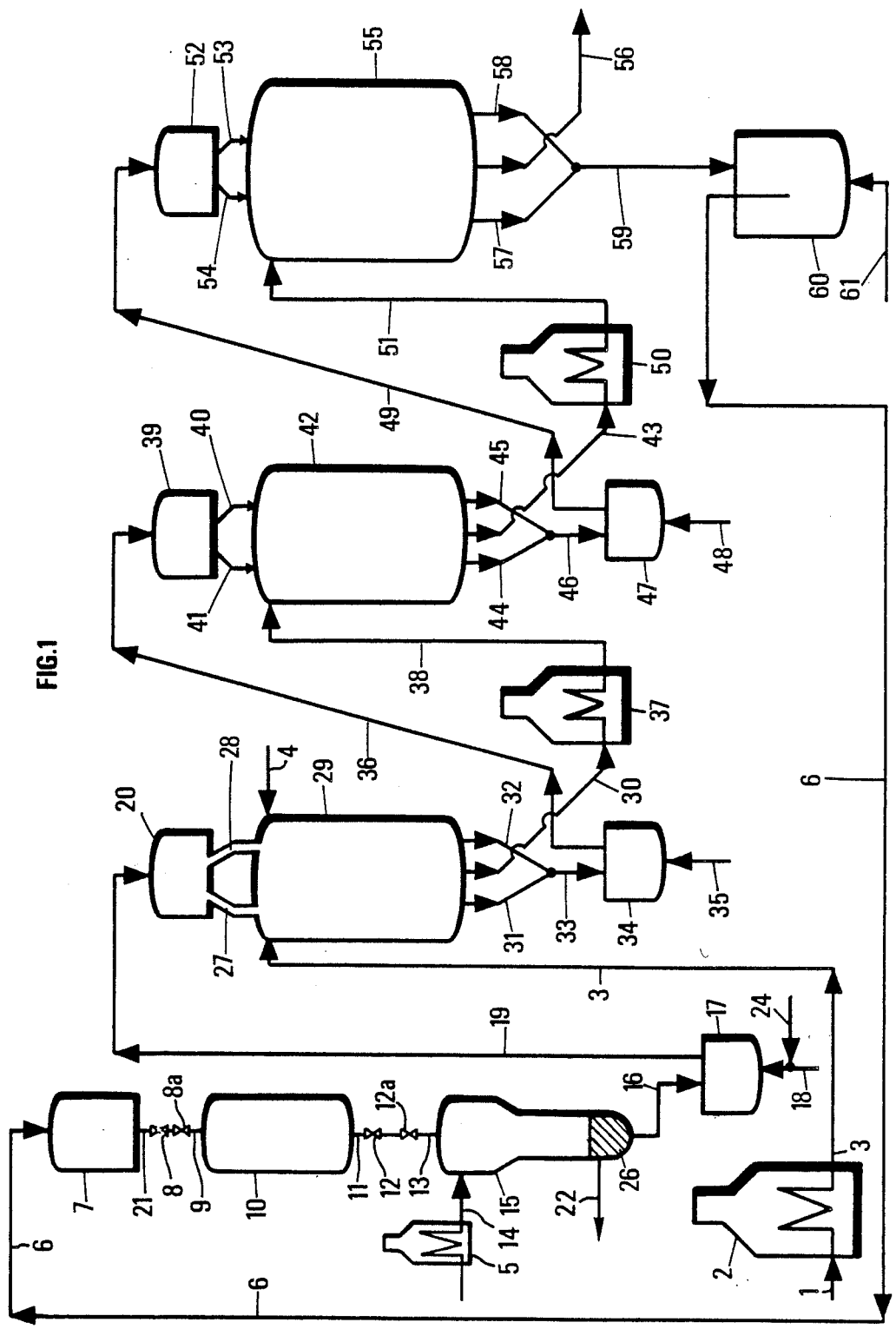
Figure 2:
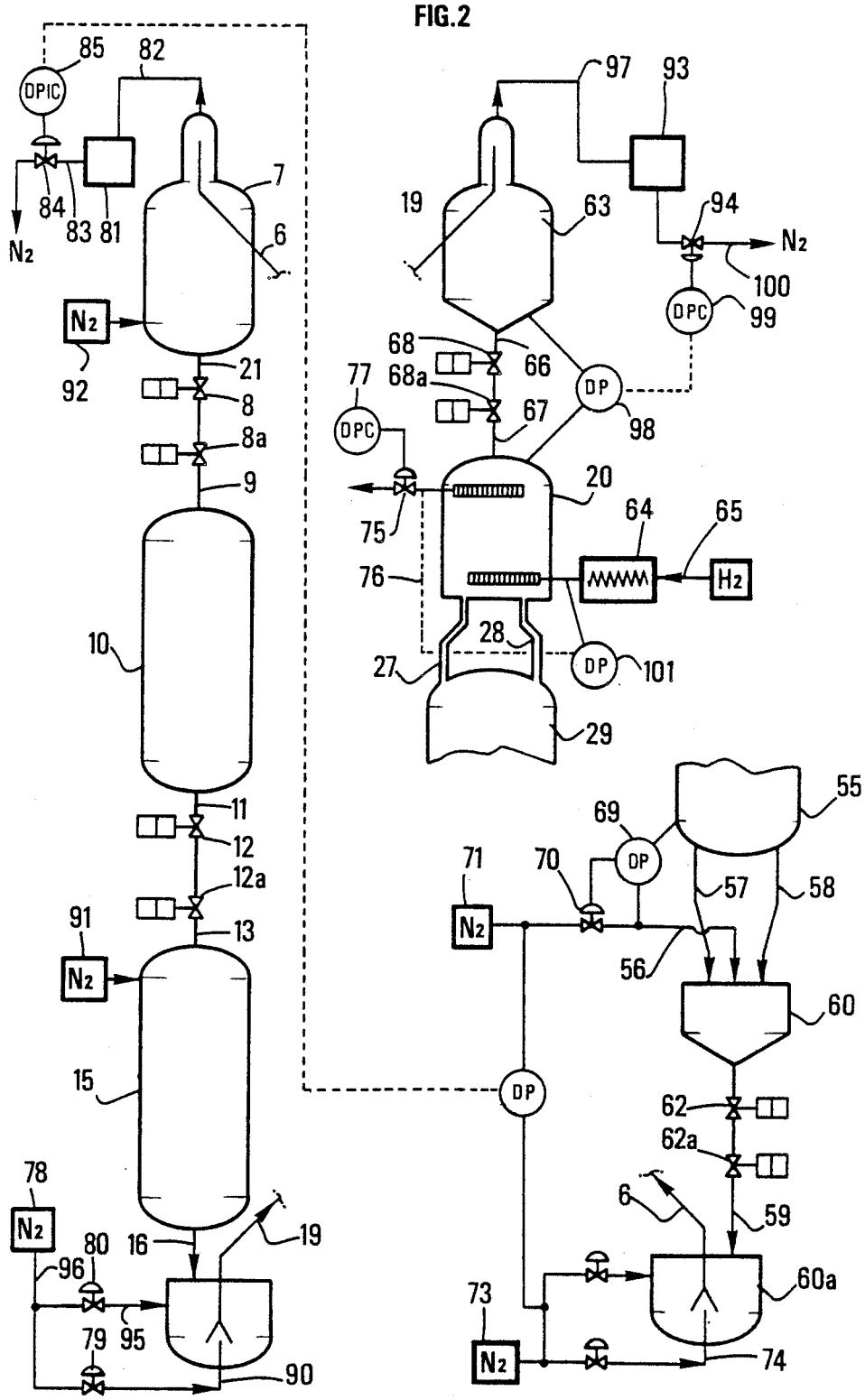
FIGS. 2 and 3 are schematic flowsheets of the invention. These are simplified and do not show either the path of the feedstock, or the reactors except for the first and last ones, or the pipe for admitting fresh catalyst to the first reactor. The abbreviations "DP" and "DPC" in the figures relate to the pressure controls. "DP" is the pressure differential or "Delta pressure". "DPC" indicates that a regulating valve is associated with "DP" to maintain the regulating line.

FIG. 2 contains the essential characteristics shown in FIG. 1 and also the arrangements for transition between the circuits under hydrogen and those under nitrogen: These access arrangements are represented at the end of the last reactor 55 by the systems 69, 70 and 71, which allow the catalyst under hydrogen in the tank 60 to pass into a medium under nitrogen, with the provision of two 2 inch (5.08 cm) valves 62 and 62a for example (these valves are easily produced).

The means 73 and 74 illustrate the starting up of the lift 6 supplied with nitrogen from the reservoir or tank 60a. On emerging from regeneration, the catalyst is transported by the lift 19 (supplied with nitrogen by means 78, 80, 79) to the flask 63. The drawing shows the lines 66, 67 and arrangements 65 and 64 which enable the catalyst to be place under hydrogen again (hydrogen intake line 65, preheated by the oven 64) when the nitrogen has been removed through the lines 75 and control means 77 and 76. Here the catalyst circulates through two valves 66 and 67 only about 2 inches in size.

FIG. 2 also shows the elimination of fine particles of catalyst at the top of the lift 6 through the pipe 82, the separator 81 and lines 83 and the valve 84 (with pressure control means 85). The elutriation zone 63 (to eliminate fine particles of catalyst in zone 81a), the reduction zone 20 and their components are shown on a larger scale in FIG. 1.

Catalytic reforming units are tending to become more and more voluminous in order to treat the maximum of feedstock, and nowadays there is also an attempt to operate at lower and lower pressures. A few years ago, the pressures used were about 8 to 10 bars ($8 \times 10^5$ Pascal to $10 \times 10^5$ Pascal) whereas, now they are about 6 to 3 bars ($6 \times 10^5$ Pascal to $3 \times 10^5$ bars). Owing to the use of hydrogen in the lift taking the exhausted catalyst from the last reactor to the top of the regenerator, such units also require the section commonly known as the "tower" to be very high. In FIG. 1 the tower includes the bottom of the lift 17, the surge tanks 7 and 15, the regenerator 10 and the important valves 8, 8a, 12 and 12a. Now it is becoming difficult to construct high capacity units operating under low pressure with precision, due to the difficulties in carrying out transfers through lines of valves 4 inches (10.5 cm) or more in size between the surge tanks 7 and 15 and the regenerator 10

These valves are difficult and expensive to produce, and it would be difficult to design a change to 6-inch (15.24 cm) valves without a program of preliminary manufacture and testing, which would also be very expensive.

Problems associated with these valves include:

perfect insulation is required between the regenerator (under nitrogen and oxygen) and the buffer flasks (under hydrogen)

frequent use of the valves in an atmosphere charged with catalyst fines.

Thus the idea of the invention is as follows: to make provision for the two surge tanks to be under nitrogen, and to transfer the problem of the transition from $H_2$ to nitrogen to the small lines, particularly the lines extending from the last reactor and the lines at the top of the first reactor.

The invention can be carried out on the following principles:

the first and the last lifts operate with nitrogen or any other inert gas;

at the upper surge tank 7 (see FIG. 2):

the throughput required to obtain separation below the last reactor 55 is produced with nitrogen or any other inert gas, but so as to have a (very slight) excess pressure, so that the passage of nitrogen to the reaction section is limited as much as possible. It should be possible to limit its passage to a few kilograms per hour;

the valves used (such as 62 and 62a) below the last reactor, approximately 2 inches (5.08 cm) in size, will be motorized and will act as safety valves to insulate the regenerating section in case of problems;

the upper surge tank (7) is only under nitrogen (admitted through conduit 92) and the operating conditions (or design) are much less harsh, particularly the temperature. The lift 6 is under nitrogen or another inert gas.

Figure 3:
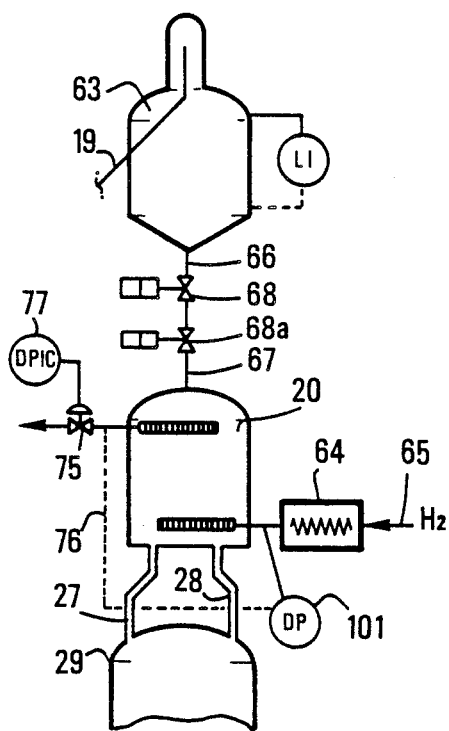

At the lower surge tank 15 (see FIGS. 2 and 3):

the tank is only under nitrogen (admitted through conduit 91) or inert gas at a low temperature;

the lift 19 is under nitrogen or other inert gas; the means 78 for admitting nitrogen into the lines 90, 95 and 96 is controlled by the means 80 and 79;

the upper hopper 63,20 is in two parts:

the upper part 63 with elutriation (that is, settling or separation) under nitrogen or any other inert gas; and the lower part 20 for storage and reduction under hot $H_2$, introduced through line 65 and preheated by an electric oven 64, with DP control 101 and DPC control 77 via 76 through the valve 75.

the two parts of the upper hopper 63,20 are separated by a leg 66,67 full of catalyst, fitted e.g., with two valves 68 and 68a e.g., about 2 inches (5.08 cm) in size, the valves being motorized and having a security function.

The safety valves can be activated should the pressure differential be incorrect, the temperature rise at the wrong time, or the nitrogen be impure, etc.

This arrangement according to the invention creates a new nitrogen network for circulating catalyst and also for elutriation (separation) through the pipes 97 and 100, the separator 93 and valve 94, in conjunction with the DP and DPC controls 98 and 99.

In view of the quantities of nitrogen required, it would be wise to provide for self-contained recirculation with a small compressor (pressure differential about 3 to 4 bars).

One of the advantages of the method and apparatus of the invention is that it is no longer necessary to provide a very sophisticated system to seal off the surge tanks from the regenerator, without reducing the safety of the operation.

Such a system greatly reduces the number of large valves and particularly the operating conditions for any other large valves remaining in the unit.

Another advantage is the substantial reduction in the total height of the tower (at least 5 to 6 meters lower).

Briefly, the invention concerns a method of reforming hydrocarbons or producing aromatic hydrocarbons in the presence of a catalyst, at a temperature of, e.g., from 480° to 600° C., wherein an initial feedstock comprising hydrocarbons, and hydrogen are circulated through at least two reaction zones arranged in series, side by side, each of the reaction zones being of the fluidized bed type, the feedstock circulating successively into each reaction zone and the catalyst also circulating successively through each reaction zone, flowing continuously down each zone in the form of a fluidized bed, the catalyst drawn off from the bottom of each reaction zone (except the last) being conveyed in a hydrogen stream to the top of the next reaction zone, the catalyst drawn off continuously from the bottom of the last reaction zone through which the feedstock passes then being sent into a regenerating zone. The method is characterized:

(a) in that the exhausted catalyst drawn off from the last reaction zone through which the feedstock passes is purged of all the surrounding hydrogen, (b) in that the exhausted catalyst is then place put under nitrogen, (c) in that the exhausted catalyst is passed into a regenerating zone by means of a nitrogen stream, (d) in that the regenerated catalyst is passed by means of a nitrogen stream into a zone for elutriating the fine particles of regenerated catalyst, and that all the surrounding nitrogen is then purged, and (e) in that the regenerated catalyst is passed into a chamber in the presence of hydrogen, with a view to partially or totally reducing the catalyst before it is sent continuously into the first reaction zone.

By operating in this way, using the appropriate sets of valves 62 and 62a below the last reactor and 68 and 68a above the zone for reducing the regenerated catalyst (before it is fed into the first reactor) most of the large valves directly upstream and downstream of the regenerator can be dispensed with, as explained above.

What is claimed is:

1. In a method of reforming hydrocarbons or producing aromatic hydrocarbons in the presence of a catalyst, wherein an initial feedstock comprising hydrocarbons and hydrogen are circulated through at least two reaction zones arranged in series side by side, each of the reaction zones being of the fluidized bed type, the feedstock circulating successively into each reaction zone and the catalyst also circulating successively through each reaction zone, flowing continuously down each zone in the form of a fluidized bed, the catalyst drawn off from the bottom of each reaction zone, except the last, being conveyed in a hydrogen stream to the top of the next reaction zone, the catalyst drawn off continuously from the bottom of the last reaction zone through which the feedstock passes, then being sent into a regenerating zone, the improvement comprising:

(a) the exhausted catalyst drawn off from the last reaction zone through which the feedstock passes is purged of all the surrounding hydrogen, (b) the exhausted catalyst is then placed under nitrogen, (c) the exhausted catalyst is passed into a regenerating zone by means of a nitrogen stream, (d) the regenerated catalyst is passed by means of a nitrogen stream into a zone for elutriating the fine particles of regenerated catalyst, and all the surrounding nitrogen is then purged, and (e) the regenerated catalyst is passed into a chamber in the presence of hydrogen, with a view to at least partially reducing the catalyst before it is sent continuously into the first reaction zone.

2. In a method of reforming hydrocarbons or producing aromatic hydrocarbons in the presence of a catalyst, wherein an initial feedstock comprising hydrocarbons and hydrogen are circulated through at least two reaction zones arranged in series side by side, each of the reaction zones being of the fluidized bed type, the feedstock circulating successively into each reaction zone and the catalyst also circulating successively through each reaction zone, flowing continuously down each zone in the form of a fluidized bed, the catalyst drawn off from the bottom of each reaction zone, except the last, being conveyed in a hydrogen stream to the top of the next reaction zone, the catalyst drawn off continuously from the bottom of the last reaction zone through which the feedstock passes, then being sent into a regenerating zone, the improvement comprising:

(a) the exhausted catalyst drawn off from the last reaction zone through which the feedstock passes is purged of the surrounding oxygen and then placed under a nitrogen atmosphere.

3. A process according to claim 2, further comprising passing the exhausted catalyst into a regenerating zone by means of a nitrogen stream.

4. A process according to claim 3, further comprising elutriating fine particles of resultant regenerated catalyst with a nitrogen stream.

5. A process according to claim 3, further comprising purging the nitrogen from the resultant regenerated catalyst and mixing the resultant catalyst with hydrogen.

* * * * *